Jan. 19, 1971   R. C. HAWES   3,556,659
LASER-EXCITED RAMAN SPECTROMETER
Filed Feb. 3, 1966   3 Sheets-Sheet 1
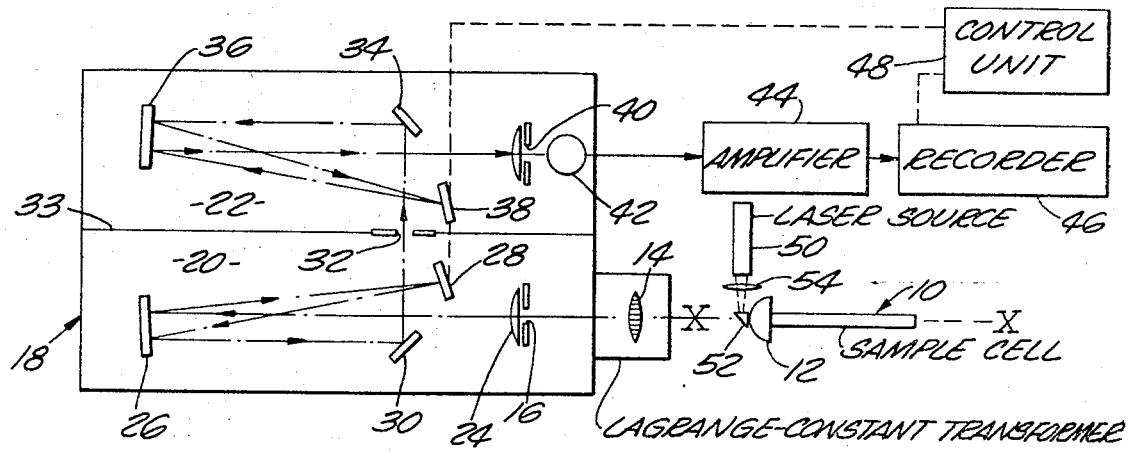
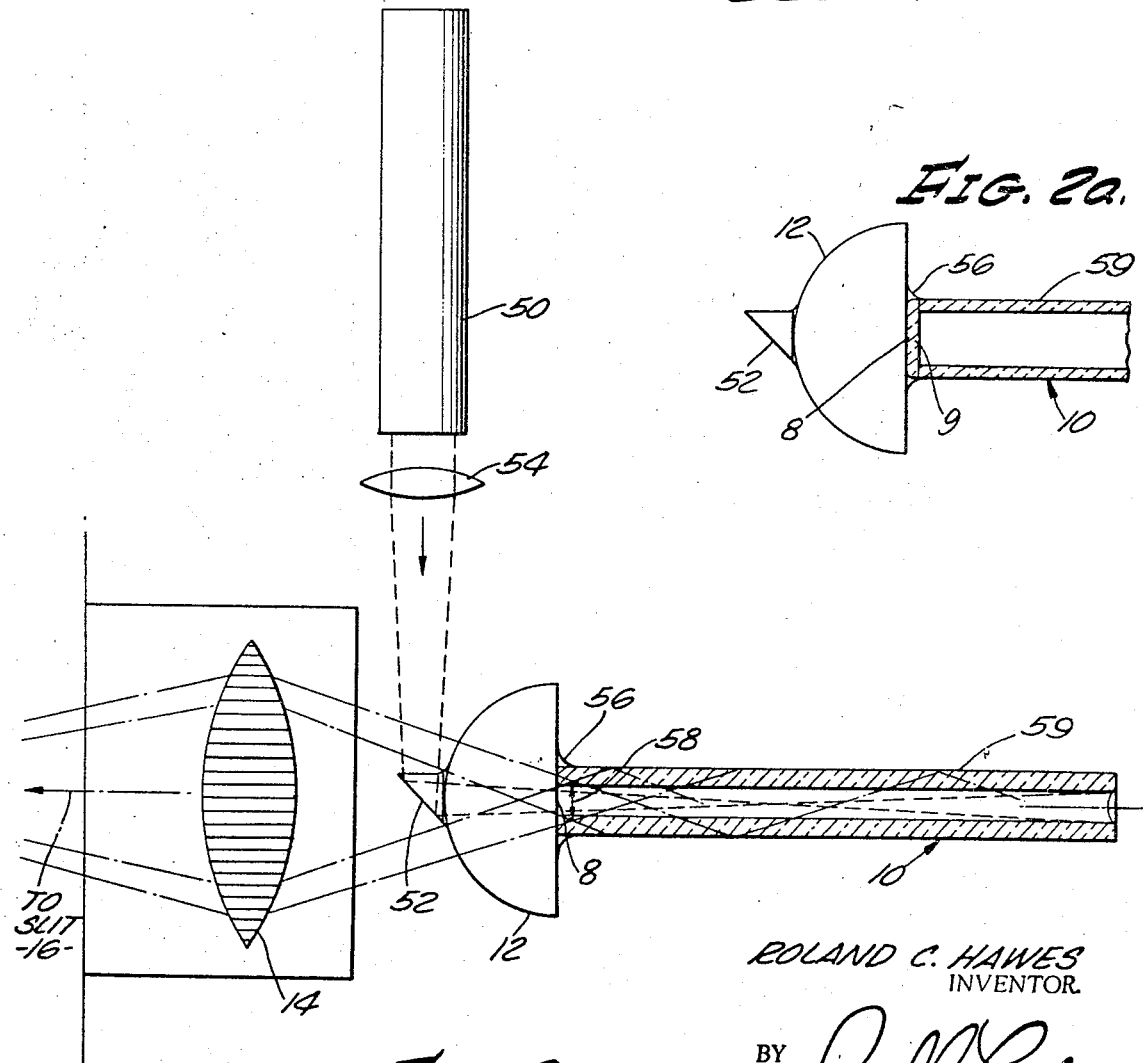
ROLAND C. HAWES
INVENTOR.
BY
ATTORNEY

ROLAND C. HAWES
INVENTOR.

BY
ATTORNEY

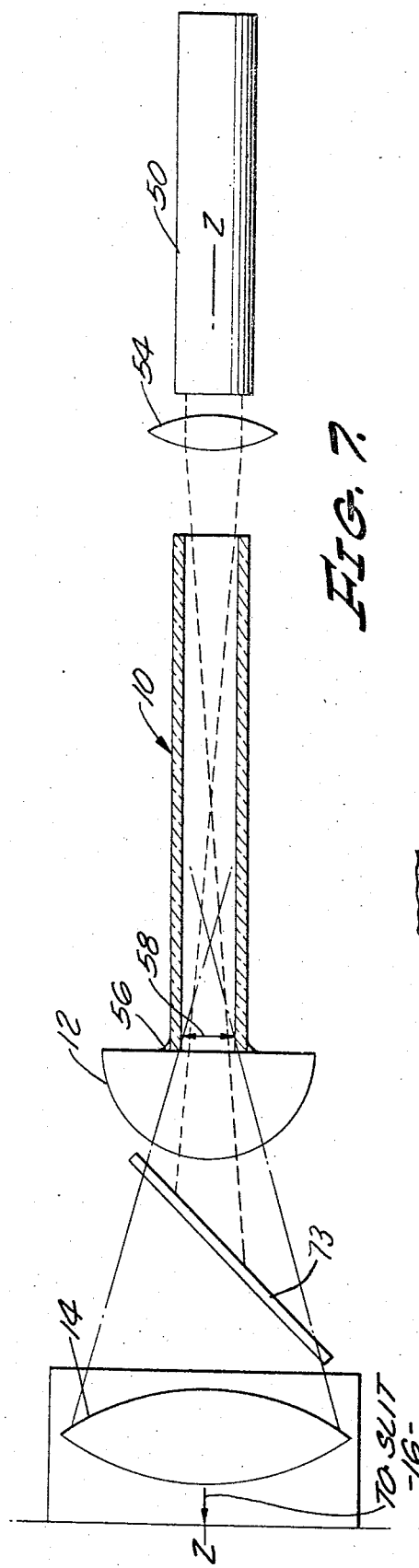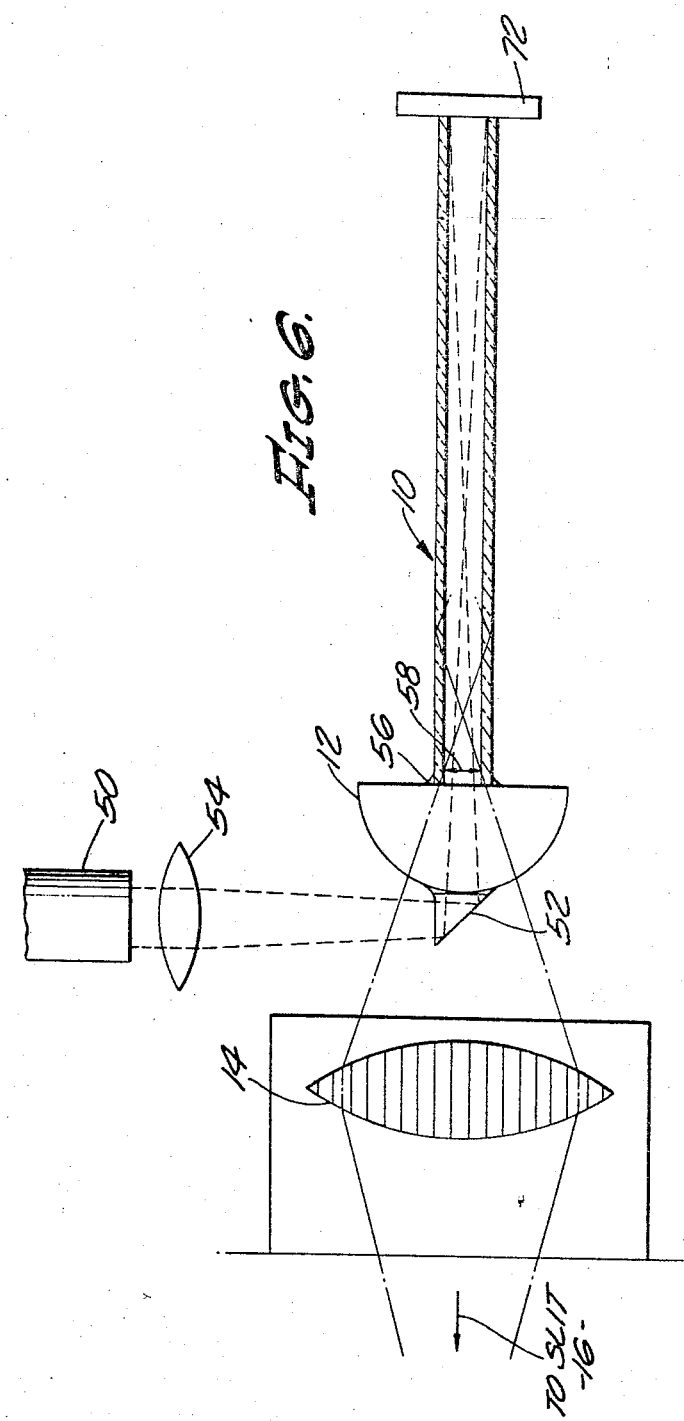

United States Patent Office 3,556,659
Patented Jan. 19, 1971

3,556,659
LASER-EXCITED RAMAN SPECTROMETER
Roland C. Hawes, Monrovia, Calif., assignor to Applied Physics Corporation, Monrovia, Calif., a corporation of California
Filed Feb. 3, 1966, Ser. No. 524,687
Int. Cl. G01j 3/44
U.S. Cl. 356—75
27 Claims

ABSTRACT OF THE DISCLOSURE

A laser-excited Raman spectrometer in which a laser output beam having a very small diameter is projected along the length of a capillary sample cell, rather than being projected in a transverse direction. The beam is substantially coaxial with the cell and the resultant Raman travelling in the general direction of the cell axis is detected.

---

This invention relates to an analyzing instrument for analyzing optical radiation emitted from a sample of material as in Raman spectroscopy, and, more particularly to an analyzing instrument embodying an improved arrangement for exciting such samples of material with monochromatic radiation.

The analyzing instrument of the invention is particularly adapted to applications in which optical radiation of one wavelength interacts with a sample of material to cause optical radiation of at least one different wavelength to be emitted from such sample, although it is not limited solely to that particular application. In the best mode of practicing the invention now known, it is employed in Raman spectroscopy.

Raman spectra occur when light of one wavelength interacts with molecules in a sample and as a result, light of a different wavelength is scattered by the molecules. In the Raman scattering process, the wavelength of the exciting radiation is altered by molecules, in such a way that a quantized exchange of energy occurs causing radiation of a different wavelength to be emitted. As a result of the interaction, the energy of the emitted light is different from the energy of the exciting light, either being increased or being decreased by amounts that correspond to certain differences in the energy levels characteristic of the molecule of material being irradiated. As a result of the Raman process, a spectrum that is characteristic of the molecule is produced in terms of the differences in the frequencies of various Raman lines in the spectrum from the frequency of the exciting radiation. This is a Raman spectrum. In view of the fact that the energy levels of the molecules are quantized, the frequency differences have a series of discrete values which characterize the different Raman lines or bands. It is noted that the Raman lines do not have any fixed frequencies, but that their frequencies depend upon the frequency of the exciting radiation. However, the difference between the frequency of each Raman line and the frequency of the exciting radiation is independent of the frequency of the exciting radiation. The theory and practice of Raman spectroscopy has been explained in U.S. Pat. No. 2,940,355, granted to Henry H. Cary on on June 14, 1960. It is also described in detail in Chapter XIV of a book entitled "An Introduction to Molecular Spectra" by Raynor C. Johnson, Pitman Publishing Corporation, 1949.

The lines in a spectrum are relatively weak. Furthermore, as with other light scattering, the molecular scattering of the Raman effect varies in intrinsic efficiency with the fourth power of the wavelength of the exciting radiation. For this reason, it has been customary in the past to employ, as a source of exciting radiation, a conventional mercury lamp for emitting monochromatic radiation having a wavelength of 4358 A. The use of such short-wavelength radiation has many disadvantages which, it has come to be recognized, could be overcome by employing monochromatic radiation of longer wavelength. For one thing, when using short wavelength radiation for excitation, the Raman lines are masked somewhat by fluorescent radiation occurring in the sample and no one has yet found a practical way of distinguishing the fluorescent radiation from the Raman radiation. Such masking fluorescent radiation may even be generated by impurities in the sample. While most samples are carefully "cleaned up" either by distillation or by chemical adsorption methods to minimize difficulty from such impurities, this is a troublesome extra step in sample preparation and may even result in modification of the composition of the particular component of the sample which is undergoing investigation in an unknown manner.

In Raman spectroscopy, a tube, or capillary cell, is utilized to hold a sample of material to be analyzed. As heretofore practiced, the exciting radiation was directed into the capillary cell in a direction substantially normal to the axis of the cell. The Raman radiation emanating from the cell and passing out of one end of the cell was collected and analyzed by use of an instrument such as a spectrophotometer. This technique suffers from the disadvantage that large amounts of fluorescent radiation are emitted by the material forming the wall of the cell. Such background radiation makes the detection of the Raman spectrum difficult.

The foregoing difficulties suffered when using a short wavelength excitation source have led investigators to consider the possibility of using longer wavelength excitation. But the use of the longer wavelength radiation leads to new difficulties. For example, tests have been made with gas discharge sources, such as potassium, rubidium or cadmium lamps, which have strong emission at wavelengths above 5000 A. Using such sources, it has been difficult to generate sufficient excitation energy to produce usable Raman spectra. It is still more difficult to isolate a single line or narrow wavelength region from these excitation sources. Such sources have generally been excited at radio frequencies, causing a radio interference problem. Furthermore, the lamps tend to be short-lived and require special coatings on the interior of the glass to reduce the rate of attack on the glass by the alkali metal vapor contained therein.

Longer wavelength excitation is also difficult to employ because, as mentioned before, the intrinsic excitation efficiency falls with the fourth power of the wavelength of the exciting radiation. This phenomenon is well known and is set forth in the aforementioned book of Johnson.

Additional difficulties have arisen at long wavelengths because the phototubes used to detect the Raman radiation often have less efficiency at higher wavelengths than at lower wavelengths. Furthermore, phototubes for use at wavelengths longer than about 7000 A. generally have high "dark" current, that is, the current that flows in the phototube when there is no radiant flux incident upon the phototube. Since dark current decreases rapidly with cooling such phototubes must be refrigerated for best operation.

Recently, a number of investigators have attempted to excite Raman spectra by the relatively long wavelength radiation from intermittently operating lasers. As is well known, the peak power output, such as from a ruby laser, can be very high, but its average power output, because the output of the laser is in the form of pulses, ranges from a few milliwatts to a few watts. This is not as great as the average power output of the mercury lamp which has been conventionally used to arouse excitation at the 4358 A. wavelength. Recently, lasers have become available which have continuous output, generally about 0.1 watt or less. However, up until now it has been considered impractical to use such a source of radiation because of the low power output level of the laser.

The present invention relates to an analyzing instrument which makes efficient use of a continuous output laser of the axial-mode, often called a single-mode, type, as the source of exciting radiation.

As is well known, the output of a laser is a collimated beam of light, that is a beam in which the rays of which are very nearly parallel.

The present invention takes advantage of the parallel characteristics of, the rays comprising the laser output beam, and the fact that only one such beam exists when an axial-mode laser is employed. A laser output beam, having a very small diameter, is projected along the length of the capillary cell, rather than being projected into the cell in a transverse direction. Thus, the exciting beam of radiation is substantially coaxial with the cell. The resultant Raman radiation travelling in the general direction of the cell axis is detected. In the best embodiment of the invention now known, the laser beam enters from the end of the cell from which the Raman scattered radiation emerges. However, the invention may also be practiced with the laser beam entering the end of the cell opposite to that from which the Raman radiation emerges.

In the best embodiment, a capillary tube is employed, and the laser beam is largely confined to the capillary bore, and very little of it traverses the capillary wall. In this way scattering of laser radiation from the cell wall and excitation of fluorescence in the cell wall is minimized. Although confinement of the beam to the capillary bore requires accurate alignment of the laser beam with the capillary cell, it is worthwhile because it minimizes fluorescence of the glass wall and scattering of light from the cell wall itself.

Also, in the present invention, the Raman radiation that is excited in the sample within the bore of the cell is collected from the end of the cell over an area which is larger than the capillary bore itself. As a result, Raman radiation from the sample that otherwise would be lost, is utilized.

In the best embodiment of the invention, the capillary cell is of circular cylindrical configuration and the cross-sectional area of the cell from which radiation is collected, is square. In order to attain such collection over a square area, use is made of an image slicer or other Lagrange-constant transformer which makes it possible to transmit radiation emerging from a square area in the sample cell through a narrow entrance slit of the spectrometer, to the collimating mirror—thus utilizing the full light-transmission efficiency of the spectrometer. Such a Lagrange-constant transformer is described and claimed in the aforementioned United States Pat. No. 2,940,355.

Further features and advantages of the invention will become apparent from the following description, taken in conjunction with the accompanying drawings, in which:

FIG. 1 is a schematic diagram of a spectrophotometer embodying the invention;

FIG. 2 is an enlarged schematic view, partly in section, of a portion of the apparatus illustrated in FIG. 1 and illustrating one embodiment of the invention;

FIG. 2a shows a variation of the apparatus illustrated in FIG. 2;

FIGS. 3, 4, 5, 6 and 7 are views, similar to that of FIG. 2, illustrating other embodiments of the invention.

General description

Figure 3:
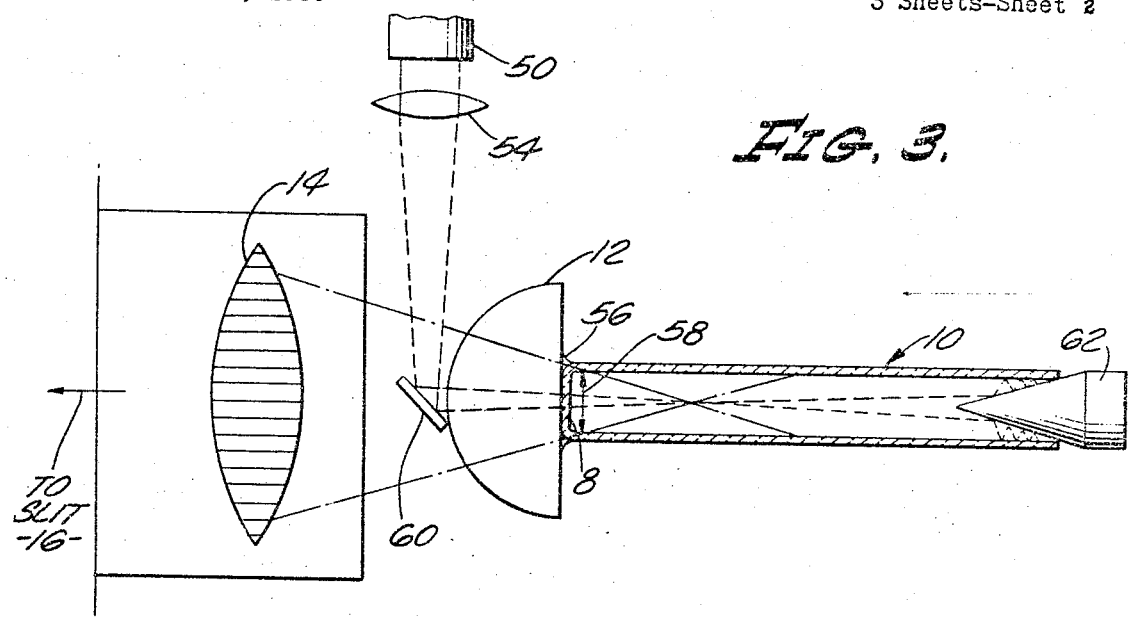

In the embodiment of the invention illustrated in FIG. 1, Raman radiation emerging from one end of a capillary cell or tube 10 along an optical axis X—X is transmitted through lens 12 and Lagrange-constant transformer 14, which direct the radiation into an elongated entrance slit 16 of a double-grating monochromator 18 comprising a lower section 20 and an upper section 22. In effect, a light window 8 exists at the end of the tube from which the Raman radiation emerges. The monochromator 18 is of a construction which is described in the aforementioned Cary Pat. No. 2,940,355. Therefore, it will be described only briefly here. The Lagrange-constant transformer 14 images an aperture stop, such as that provided by the entrance slit, on one side of the transformer as a square on the other side as more fully explained in Pat. No. 2,940,355. In the embodiment of the invention illustrated, the square is located at the light window 8.

For convenience in this application, an aperture stop, such as a slit, is said to be imaged at an area irrespective of whether radiation travels from the aperture stop to the area or from the area to the aperture stop. In the embodiment of the invention described here, as in that described in the patent, scattered radiation emerging from the sample cell is transmitted by the Lagrange-constant transformer 14 into the monochromator 18.

The scattered radiation that emanates from the cell 10 and passes through the entrance slit 16, then passes through a lens 24 and is reflected by a collimating mirror 26. The radiation from the mirror 26 is deflected as a collimated beam to a first grating 28. Hetero-chromatic radiation diffracted by the grating 28 returns to the collimating mirror 26, which reflects it to a mirror 30, which in turn reflects the radiation thorugh an intermediate slit 32. The intermediate slit 32, which is located in a wall 33 which separates the monochromator 18 into two monochromator sections 20 and 22, acts as an exit slit for the monochromator section 20 and as an entrance slit for the monochromator section 22. Radiation passing through the slit 32 is reflected by a mirror 34 toward a collimating mirror 36. The mirror 36, in turn, reflects the radiation as a collimated beam toward a second diffraction grating 38. Monochromatic radiation of a desired wavelength that is diffracted by the grating 38 is returned to the collimating mirror 36, which focuses the monochromatic radiation at an exit slit 40.

Monochromatic radiation passing through the exit slit 40 impinges upon a photocell 42, whose electrical output signal is amplified by an amplifier 44, and then applied to an automatic recorder 46 of conventional type to provide a spectrogram of the spectrum emitted from the sample contained in the capillary cell or tube 10.

The two gratings 28 and 38 may be in the form of identical replica gratings. Both gratings are mounted on the same rotatable frame, and at such angles that the normals to both gratings are always inclined at the same angles with respect to the collimated beams incident thereon. The two gratings are rotated in unison by means of a control unit 48 so as to vary the wavelength of the monochromatic radiation emerging from the exit slit 40. The control unit 48 is also employed to drive a strip of recording paper in the recording means 46, while the spectrum is being scanned to produce a spectrogram.

LASER EXCITATION OF RAMAN SPECTRA

In the embodiment of the invention that is shown in FIGS. 1 and 2, a laser source 50 is employed for irradiating a sample of material contained in the capillary cell or tube 10, along the axis of the tube. Such a tube has a length which is very much longer than the diameter of its bore. The rays of exciting radiation, which are emitted from the laser source, are substantially parallel, thus forming a so-called parallel or collimated beam. By employing a laser of the axial mode type, only one such collimated beam emerges from the laser. The exciting radiation from the laser 50 is transmitted into the capillary cell or tube 10 through the light window 8 substantially along the axis of the cell 10 by means of a small, totally-reflecting prism 52 cemented to the front surface of the lens 12 substantially on the tube axis.

Such lasers are well known in the art and are described for example, in a four-part article appearing in Electronics, October 1961, starting at page 40; Nov. 3, 1961, starting at page 40; Nov. 10, 1961, starting at page 81; and Nov. 24, 1961, starting at page 54. For this reason, lasers per se will not be discussed here. A suitable source for use in the present invention is a helium-neon laser manufactured by Spectra-Physics, Inc., Mountin View, Calif. and designated by them as the Model 116. The beam produced by the laser is approximately two millimeters in diameter. This laser oscillates only in axial modes and over a very narrow band of frequencies corresponding to radiation having a wavelength of 6328 A. in vacuum.

As best seen in FIG. 2, the laser beam is directed into the capillary cell 10 by the small totally reflecting 45° right prism 52 cemented on the front of the lens 12.

The lens 54 located at a position off the optical axis X—X acts in combination with the lens 12 to focus the laser beam at a point within the bore of the capillary cell 10. An optical contact medium 56 that is immiscible with the sample under investigation, may be utilized to provide contact between the back surface of the lens 12 and one end of the capillary cell 10. Glycerol is generally suitable for this purpose when the sample is a nonaqueous solution. However, when aqueous solutions are employed the capillary tube is sealed at the lens end with a cap 9 in the form of a glass plate fused to the tube as illustrated in FIG. 2a. The focal length of the lens 54 is such as to bring the laser beam to a focus at a spot substantially in the middle of the length of the capillary cell 10. The minimum size of the spot is limited by diffraction and is defined by the "Airy disc" (see Jenkins and White, "Fundamentals of Optics," 3rd edition, page 302). It has been found possible to employ in this invention a capillary tube which has an inside diameter as small as 0.5 mm. and an outside diameter of 2.0 mm. and a length of 5 cm. For a laser beam of the wave length employed in the present instance and for such a capillary cell, the Airy disc has a diameter that is smaller than the inside diameter of the capillary tube. The Airy disc is the area through which approximately 84 percent of the energy in the beam is transmitted. In this embodiment of the invention, this diameter is less than the area at that location for which radiation can be transmitted through the monochromator within the limit of its light graps. It is to be noted that the bore as a diameter somewhat greater than that of the Airy disc so as to maintain the amount of exciting radiation reaching the wall of the tube very small.

When utilizing a well-collimated laser beam, the beam can be deflected into the capillary cell by a totally reflecting prism 52, which is less than one millimeter square. A lens 12, having a hemispherical shaped and composed of fused silica and having a radius of curvature of 4 mm. has proved to be satisfactory. The focal length of the lens 54 is much longer, a focal length of 10 cm. to 200 cm. being satisfactory under varying conditions. Inasmuch as the Raman beam emerging from the capillary cell 10 has a diameter of over 7 millimeters at the surface where it emerges from the lens 12, the diminution in the intensity of the Raman spectrum due to the obstruction by the prism 52 is only about 2.5 percent. The prism is bonded to the surface of the lens with a body of transparent cement or is fused to the lens 12, so that the lens does not affect the focussing of the laser beam, within the capillary tube 10.

Contrary to what one might expect from considerations of geometrical optics alone, the beam is not focused at a sharp point and does not have sharp boundaries that separate a radiant area from a non-radiant area. On the contrary, due to diffraction, the energy of the collimated beam is not focussed at a point but is nevertheless largely confined to an Airy disc, as previously mentioned. In this invention, most, at least about 85%, of the radiation in the beam travels to that disc within a conical volume having the disc at one end and extending over an area at the entrance to the cell less than that defined by the inside diameter of the capillary tube. Thus, in accordance with this invention, the energy of the transmitted beam is confined largely within the bore of the capillary tube though, because of diffraction effects, a small amount of it weakly illuminates the wall of the tube. It is very important to minimize the illumination of the cell wall by the exciting radiation even when the exciting radiation is supplied from a helium-neon laser that emits radiation having a wavelength of 6238 A. By confining the energy of the beam almost entirely to the bore of the tube, fluorescence from the wall is minimized.

The effects of fluorescent radiation are reduced partly by the use of a laser source which emits long wavelength radiation rather than blue or ultra-violet radiation. It is also aided partly by the fact that the laser is of the axial-mode type, thus projecting only a single beam of exciting radiation into the capillary cell. In this connection, it will be understood that if the laser was not of the axial-mode type, collimated beams traveling in other directions would emerge from the laser and some of these traveling very nearly along the axis of the capillary tube would be brought to a focus at points off the axis of the tube, some of them even entering the wall of the tube and hence causing it to fluoresce and to emit Raman lines characteristic of the glass.

It has been found that when a laser beam is projected along the axis of such a small capillary tube, in accordance with this invention, the intensity and purity of the Raman radiation emitted are comparable to those previously obtained by employing a mercury lamp to illuminate a much larger cell such as one having an inside diameter of 19 mm. and a length of 20 cm. Thus, with this invention, the volume of sample required to produce satisfactory Raman spectra has been reduced by more than 99.9%.

It has also been found that this invention can be employed not only to provide high quality Raman spectra with non-fluorescent samples but even produces satisfactory Raman spectra from samples that fluoresce.

As indicated in FIG. 2, the Lagrange-constant transformer 14 produces a composite slit stop image 58 of the entrance slit 16 in a plane within the capillary cell 10 adjacent the light window 8, as described in U.S. Pat. No. 2,940,355. The outside diameter of the capillary cell 10 is sufficiently great that the stop image 58 is contained within the cross-sectional area of the capillary cell 10. It is also pointed out that the stop image 58 need not be contained within the inside cross-sectional area of the cell 10. In the best embodiment of the invention, the stop image 58 encompasses the inside cross-section of the capillary tube. As a result, all of the Raman radiation that emerges from the bore of the cell 10 within the solid angle accepted by the Lagrange-constant transformer 14 is collected by the monochromator through the entrance slit 16. Additionally, other Raman radiation that would otherwise be lost is collected by the monochromator. This radiation includes Raman radiation that is scattered from various parts of the sample in the cell and which enters the cell wall but is totally reflected from the exterior surface 59 of the cell wall. It is to be pointed out that for a given amount of power in the laser beam projected into a capillary cell 10 as described above, the intensity of the Raman spectrum varies inversely with the cross-sectional area of the entire capillary cell down to a cross-sectional area that can just enclose the stop image 58. For this reason, the outside diameter of the capillary cell is brought as close to this limiting diameter as practicable. Even though the inside diameter of the capillary cell may be decreased to further decrease the volume of the sample, the outside diameter of the capillary cell is maintained large enough to encompass the stop image 58 in order to collect as much of the Raman radiation as possible.

FIG. 3 illustrates another embodiment of the invention in which the totally-reflecting prism 52 (FIG. 2) is replaced by a small totally-reflecting mirror 60. The mirror 60 serves the same purpose as does the prism to direct the beam of light from the laser 50 into the capillary cell 10 to irradiate a sample contained therein. As shown in FIG. 3, in order to prevent any light from the laser from being reflected from the cell 10, and passing through the Lagrange-constant transformer 14 into the monochromator through the slit 16, the capillary cell 10 is terminated at its end remote frrom the lens 56 with a radiation-absorbing structure 62, which absorbs almost all of the light that reaches it from the laser.

Figure 4:
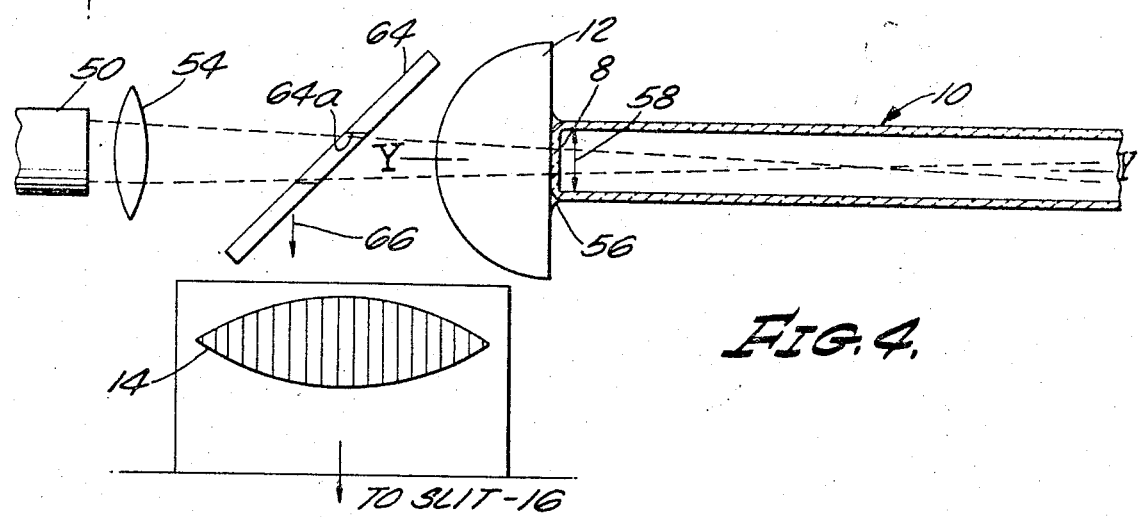

In the embodiment as shown in FIG. 4, the light from the laser 50 is focused by the lens 54, as in the embodiments previously described, but then passes through a hole 64a in a totally reflecting mirror 64 and thence along the axis Y—Y of the cell and through the lens 12 into the capillary cell 10, rather than being reflected into the cell 10. Raman radiation emerging from the cell 10 is reflected by the mirror 64 in a downward direction (as seen in the figure), as indicated by the arrow 66. That radiation is directed through the Lagrange-constant transformer 14 and entrance slit 16 into the monochromator.

Figure 5:
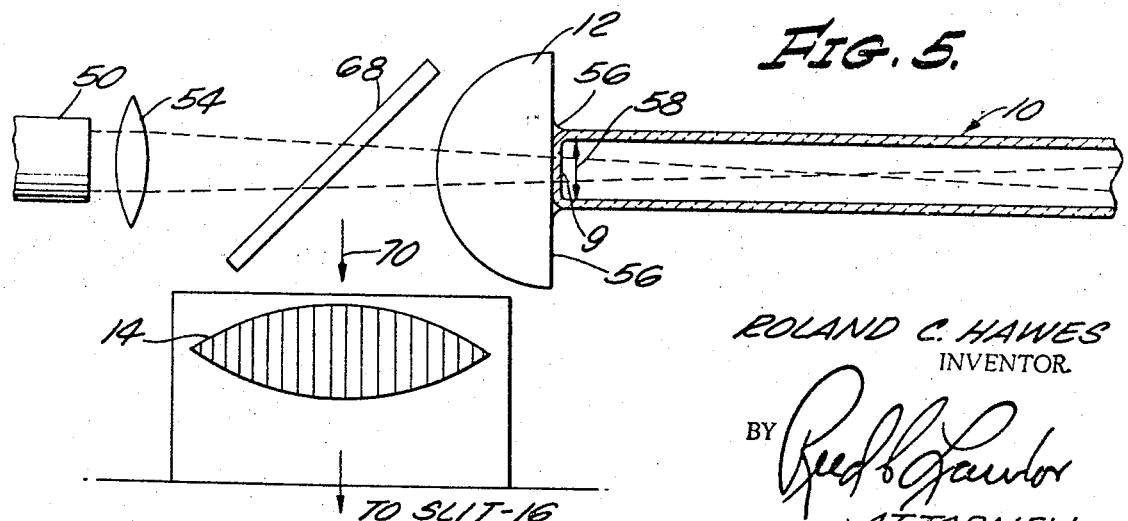

Another arrangement is shown in FIG. 5. There, light from the laser 50 is focused by the lens 54 and passes through a sharp cutoff or narrow band dielectric filter 68, also known as a dichroic mirror, and into the capillary cell 10. Radiation emanating from the cell 10 through the lens 56 is reflected by the mirror 68 in a downward direction (as seen in the figure), as indicated by the arrow 70. The reflected radiation then passes into the monochromator through the Lagrange-constant transformer 14, and slit 16 for analysis.

As is well known, such a dielectric filter has a high transmission coefficient for light in certain wavelength ranges and a high reflection coefficient for light in other wavelength ranges. In this particular case, the dielectric filter is of a type which has a high transmission coefficient at the wavelength of the laser beam and a high reflection coefficient at other wavelengths, including the wavelengths of the Raman radiation to be detected.

FIG. 6 illustrates still another embodiment of the invention in which the light from the laser 50 focused by the lens 54 is directed into the capillary cell 10 by the totally-reflecting prism 52. However, this embodiment differs from those previously described in that reflecting means such as a mirror 72 is provided at the end of the capillary cell 10 remote from the lens 12 so that any radiation reaching the mirror 72 is reflected toward the lens 12, and passes through the Langrange-constant transformer 14 and entrance slit 16. The use of such a mirror in this arrangement increases the Raman radiation output by a factor of about four, because the sample contained in the tube 10 is illuminated by exciting radiation from both directions and the Raman radiation would also, in effect, be collected from both directions. Using such an arrangement, a capillary cell only about one centimeter long and about 0.2 millimeter or less inside diameter may be utilized to permit very small samples of material to be analyzed. This makes possible a reduction in sample size by a factor of over 35,000 compared with prior devices.

It was previously pointed out that the exciting radiation may enter the capillary cell or tube from the end remote from that from which the Raman is emitted (see FIG. 7). In such a case the monochromator or other detecting means must have a very high rejection ratio for the exciting radiation, or it must be assisted by narrow band filters or by low-pass or high-pass filters.

A simple arrangement for exciting the Raman spectrum by projecting the exciting radiation into the remote end of the tube is illustrated in FIG. 7. In this arrangement radiation from a laser 50 is transmitted through a lens 54 along the axis Z—Z of a capillary tube and where a dielectric filter 73 is employed to reflect radiation in the laser beam to one side to reduce the amount of such radiation entering the entrance slit 16 of the monochromator. In the system of FIG. 7, the lens 12 aids in selectively transmitting Raman radiation through the entrance slit 16 because the image of the stop 58 is focused on the entrance slit, whereas the laser beam appears to be coming from a point near the center of the capillary tube, hence causing the laser beam to be out of focus relative to the entrance slit 16.

While the invention has been described only with reference to Raman spectroscopy, in which the scattered radiation has a different wavelength from the exciting radiation, it will be understood that it may also be applied to measuring scattered radiation of the same wavelength as the exciting radiation, such as occurs in Rayleigh, Tyndall or Brillouin scattering.

Although only a few embodiments of the invention have been illustrated and described, it is apparent that many modifications may be made therein by one skilled in the art without departing from the scope of the invention. More particularly, it will be clear that advantageous use may be made of this invention even if the Raman radiation is selectively detected with means other than a spectrometer.

I claim:
1. In a spectrometer having an entrance slit:
   a tube for holding a sample of a material to be analyzed, said tube having a tubular wall enclosing a bore forming a sample region, said bore having a length that is much greater than its diameter, said bore having an axis along its length;
   excitation means for directing a beam of monochromatic exciting radiation into one end of said tube substantially along said axis without passing through the tubular wall of the tube thereby causing radiation to be scattered by a sample without substantial scattering of exciting radiation by the tubular wall of the tube;
   imaging means for collecting radiation scattered by said sample and transmitted through one end of said tube about said axis along paths, some of which radiation involves internal reflection of such scattered radiation by the external surface of the wall of said tube and for transmitting such radiation through said entrance slit; and
   means for detecting collected scattered radiation that is transmitted through said slit, the collected radiation including some of the scattered radiation that has been internally reflected by the external surface of the tube.

2. The combination defined by claim 1, wherein the energy of the beam transmitted along the length of said tube is largely confined within said tube within a cross-sectional area that is smaller than the inside cross-sectional area of said tube whereby scattering of exciting radiation in said beam by the wall of said tube is substantially eliminated.

3. The combination defined by claim 1 wherein said excitation means comprises a light source that provides a collimated beam and means for bringing said collimated beam to a sharp focus at a small spot within said tube, said spot having a diameter of the order of that of the Airy disc and the bore of the tube having a diameter greater than the Airy disc.

4. The combination defined by claim 3 wherein said beam source is a laser.

5. The combination defined by claim 3, wherein said source of a beam of monochromatic radiation is a continuously-emitting laser of the axial-mode type.

6. The combination defined in claim 1, wherein said radiation-detecting means comprises a monochromator having aperture stops,
   and wherein said imaging means includes means for collecting radiation that emerges from the end of the wall of said tube as well as radiation emerging from the bore in said tube and transmitting radiation emerging from both areas through said aperture stops.

7. The combination defined by claim 6, wherein one of said aperture stops is imaged adjacent the nearer end of said tube, the cross-sectional area of the image being larger than the inside cross-sectional area of said tube.

8. The combination defined by claim 6, wherein one of said aperture stops is imaged in said tube, the cross-sectional area of the image being larger than the inside cross-sectional area of said tube and smaller than the outside cross-sectional area of said tube.

9. The combination defined in claim 7, wherein an image of one of said aperture stops is formed in said tube, the cross-sectional area of said image being larger than the inside cross-sectional area of said tube and smaller than the outside cross-sectional area of said tube, and wherein said imaging means comprises a Lagrange-constant transformer for collecting Raman radiation that emerges from the end of the wall of said tube as well as radiation emerging from the bore in said tube and for transmitting radiation emerging from both areas through said aperture stops of said monochromator.

10. An analyzing instrument in which optical radiation of one wavelength interacts in a sample of material to cause optical radiation to be scattered from said sample comprising:
   a tube for holding a sample of such material to be analyzed, said tube having a length greater than its largest inside diameter and having a wall surrounding a longitudinal axis along said length;
   a source of a beam of monochromatic radiation of said one wavelength;
   means for directing said beam into one end of said tube along a path substantially parallel to said axis, without any substantial portion of said beam entering said wall prior to scattering by a sample in the tube whereby radiation is scattered by a sample in said tube and some of said scattered radiation emerges from one end of said tube after entering the wall of said tube and after being totally reflected inwardly from the outer surface of said wall; and
   means for detecting scattered optical radiation of selected wavelength emanating from one end of said tube, including scattered radiation that has been totally reflected from the external, longitudinal surface of the tube wall as well as radiation emerging from the end of said tube without such reflection.

11. An instrument defined by claim 10, wherein the portion of said beam that lies within said tube has a cross-sectional area that is smaller that the inside cross-sectional area of said tube.

12. The instrument defined by claim 10, wherein said beam source is a laser of the axial-mode type.

13. The instrument defined by claim 10, wherein said monochromatic beam source projects radiation along a path including said axis, and said means for directing said said beam into one end of said tube comprises substantially totally-reflecting means located substantially on said axis.

14. The instrument defined by claim 13, wherein said substantially totally-reflecting means is a prism.

15. The instrument defined by claim 10, further including a mirror having an aperture through which said beam of monochromatic radiation passes into said sample cell.

16. The instrument defined by claim 10, further including a narrow band dielectric filter which transmits radiation of one wavelength and reflects radiation of a different wavelength.

17. The instrument defined by claim 10, further including reflecting means located at the other end of said tube and having a reflecting surface at an oblique angle relative to the axis of said tube.

18. The instrument defined by claim 10, further including light absorbing means at the other end of the cell for absorbing exciting radiation reaching that end of the cell.

19. In a device for exciting and detecting radiation scattered from a sample of material,
   a capillary tube for containing such a sample,
   a lens mounted at one end of said capillary tube for transmitting radiation into and out of said one end of the tube along paths that extend in the general direction of the axis of the tube, said lens having a focal length that is very short compared with the length of the capillary tube,
   and a reflector on said axis oriented with its plane of reflection inclined relative to said axis and so designed and arranged to reflect only a small fraction of the radiation that travels along rays that extend through the lens and along the bore of the tube.

20. A device as set forth in claim 19 wherein said reflector is a mirror located on said axis adjacent the lens, the cross-section of said mirror being sufficiently small so that the mirror intercepts only a small portion of the rays that extend through said lens and in the general direction of the length of said capillary tube.

21. A device as set forth in claim 19 wherein said reflector is a totally reflecting prism secured to said lens on said axis and having an area that intercepts only a small portion of the rays extending through said lens and along the length of said capillary tube.

22. A device as set forth in claim 19 wherein said reflector is an apertured mirror.

23. A device as set forth in claim 19 wherein said reflector is a dielectric filter having a relatively high reflection coefficient in a narrow band at one wavelength and a high transmission coefficient at other wavelengths.

24. In a device for transmitting exciting radiation to a sample and for detecting radiation scattered by such sample;
   means for supporting such sample in a test space;
   a lens mounted at one end of said test space, said lens being positioned to intercept both exciting radiation transmitted into and also scattered radiation transmitted from said test space in the general direction of an axis that extends through said lens into said test space;
   a reflector adjacent said lens and extending across said axis, said reflector being shaped to bring about transmission of radiation through two coaxial conical spaces that extend outwardly from said test space through said lens about said axis, one of said conical spaces being disposed within the other of said conical spaces, one of said conical spaces extending from said test space beyond said reflector and the other of said conical spaces extending from said test space to the reflector and thence in the general direction of an axis transverse to said first mentioned axis;
   means including a laser source arranged to transmit exciting monochromatic radiation emerging from said source along its axis through the inner one of said conical spaces for focusing such monochromatic radiation at a position in said test space;
   and means for collecting and detecting radiation that emerges from said test space through said lens after being scattered by a sample in said test space through the outer one of said conical spaces.

25. A device as defined in claim 24 wherein said laser source is mounted to transmit said monochromatic radiation along a transverse axis to said mirror and thence along said first mentioned axis.

26. A device as defined in claim 25 wherein said reflector is in the form of a totally reflecting prism having a cross section that is very small compared with the cross-section of said lens for transmitting radiation along said transverse axis and thence along said first mentioned axis.

27. In apparatus for measuring Raman spectra of specimens:
   laser means for producing a beam of laser light;
   a prism reflector disposed to reflect said beam;
   a lens substantially larger in cross-section than said prism and immediately juxtaposed thereto, for passage of said reflected beam through said lens;

means defining a zone to receive and support such a specimen for impingement of said beam after passage through said lens; whereby Raman light produced at said zone travels back through said lens; and monochromator and detector means disposed to receive and process such Raman light and to generate electrical signals in response thereto.

References Cited

UNITED STATES PATENTS

| | | | |
|---|---|---|---|
| 2,827,825 | 3/1958 | White | 356—75 |
| 2,779,230 | 1/1957 | White | 88—14(SA)X |
| 2,940,355 | 6/1960 | Cary | 88—14(SE) |

OTHER REFERENCES

Maker et al.: Physical Review, vol. 137, No. 3A, Feb. 1, 1965, pages A801 and A815–A817 relied on.

Russell: Le Journal De Physique, Tome 26, November 1965, pages 620–626.

Harrick: "Multiple Reflection Cells for Internal Reflection Spectroscopy," Analytical Chemistry, vol. 36, No. 1, January 1964, pages 188–191.

De Silva et al.: "Observation of Thomson and Co-operative Scattering of Ruby Laser Light by a Plasma," Nature, vol. 203, Sept. 26, 1964, pages 1321 and 1322.

Damen et al.: "Angular Depndence of the Raman Scattering From Benzene Excited by the He-Ne cw Laser," Physical Review Letters, vol. 14, No. 1, Jan. 4, 1965, pages 9–11.

RONALD L. WIBERT, Primary Examiner

F. L. EVANS, Assistant Examiner

U.S. Cl. X.R.

356—103, 246